US008161854B2

(12) United States Patent
Fourney

(10) Patent No.: US 8,161,854 B2
(45) Date of Patent: Apr. 24, 2012

(54) BOX CUTTER AND METHOD

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 419 days.

(21) Appl. No.: 12/509,153

(22) Filed: Jul. 24, 2009

(65) Prior Publication Data

US 2011/0017031 A1 Jan. 27, 2011

(51) Int. Cl.
*B26D 3/00* (2006.01)
*B65G 43/10* (2006.01)
*B65G 37/00* (2006.01)

(52) U.S. Cl. ................. 83/39; 83/873; 83/76.1; 83/109; 83/155; 83/156; 83/163; 83/209; 83/256; 83/404; 83/425; 53/492; 53/381.1; 53/381.2; 198/779

(58) Field of Classification Search .................... 83/870, 83/872–874, 23, 26, 27, 35, 36, 39, 56, 72–76, 83/76.1, 76.6, 76.7, 76.9, 78, 84, 109–113, 83/155, 155.1, 156, 162, 163, 202, 209, 240, 83/255, 268, 331, 332, 401, 404, 404.1, 425, 83/425.2, 425.3, 438, 859, 945, 835; 53/492, 53/381.1, 381.2, 381.4, 382.1; 198/799, 198/339.1, 341.01
See application file for complete search history.

(56) References Cited

U.S. PATENT DOCUMENTS 2,729,885 A 1/1956 Wahl et al.
3,022,912 A 2/1962 Vincent
3,263,843 A 8/1966 Grahn et al.
3,550,756 A * 12/1970 Kornylak ...................... 198/637
3,922,778 A * 12/1975 Aalpoel .............................. 30/2
6,494,312 B2 12/2002 Costanzo
6,863,486 B2 * 3/2005 Ours et al. .................... 414/412
6,968,941 B2 11/2005 Fourney
7,147,097 B2 * 12/2006 Lemm ...................... 198/370.01
7,174,695 B2 2/2007 Porter et al.
7,191,894 B2 3/2007 Costanzo et al.
7,249,671 B2 7/2007 Riddick et al.
(Continued)

FOREIGN PATENT DOCUMENTS

JP 8-277026 A 10/1996
(Continued)

OTHER PUBLICATIONS

DVD containing videos My Moviel1Transtable.wmv and My MovieTransdisk.wmv downloaded from the website of the Kornylak Corporation, Hamilton, OH on Dec. 9, 2011, at the Kornylak web page having the link www.kornylak.com/transfer_tables.html.

(Continued)

*Primary Examiner* — Phong Nguyen
(74) *Attorney, Agent, or Firm* — James T. Cronvich

(57) ABSTRACT

Apparatus and method for cutting boxes. The box cutter has a rectangular work area defined by the upper run of an oblique-roller conveyor belt selectively driven forward or reverse in coordination with the actuation and deactuation of the obliquely rotatable belt rollers. Cutting tools along the sides of the work area cut into the side panels of the boxes as they are translated without rotation in a rectangular path against guide surfaces on the periphery of the work area by the sequential reversing of the conveyor belt direction and the actuation and deactuation of the box-supporting rollers.

7 Claims, 4 Drawing Sheets

U.S. PATENT DOCUMENTS

| | | | | |
|---|---|---|---|---|
| 7,284,653 | B2 | 10/2007 | Fourney et al. | |
| 7,344,018 | B2 | 3/2008 | Costanzo et al. | |
| 7,537,104 | B2 | 5/2009 | Riddick et al. | |
| 7,963,086 | B2 * | 6/2011 | Porter et al. | 53/381.2 |
| 2003/0196417 | A1 * | 10/2003 | Close et al. | 53/485 |
| 2006/0070854 | A1 * | 4/2006 | Boelaars | 198/779 |
| 2007/0162174 | A1 | 7/2007 | Doke et al. | |

FOREIGN PATENT DOCUMENTS

| | | | |
|---|---|---|---|
| JP | 8-277029 | A | 10/1996 |
| JP | 10-53230 | A | 2/1998 |
| NL | 9202220 | A | 7/1994 |
| WO | 02/12070 | A1 | 2/2002 |
| WO | 2007/112740 | A1 | 10/2007 |

OTHER PUBLICATIONS

Myung-Hwa Machinery Co. Ltd., South Korea, website www.mhe.co.kr/product_movie.html Chain and Roller and photographs of the chain and roller from other pages on the website at least as early as Oct. 2011.

* cited by examiner

BOX CUTTER AND METHOD

BACKGROUND

The invention relates generally to box, or carton, cutters and, more specifically, to apparatus and methods for cutting through a box conveyed through a work area on a conveyor belt.

Meat products are often delivered to meat-cutting plants in boxes. Within the boxes are multiple cuts of meat in sealed bags. Typically, the boxes are cut open manually, and the bags of meat are set on conveyors to be opened by other operators.

SUMMARY

In one aspect, a box cutter embodying features of the invention includes a conveyor belt that can be advanced in or opposite to a first direction. The conveyor belt has box-supporting rollers that can rotate on axes oriented oblique to the first direction. The conveyor-belt rollers support a box within a four-sided work area. A guide surface disposed along each side of the work area registers and guides the box. A cutting tool is disposed at an intermediate position along each side to cut into the side panels of the box registered against the guide surface. The conveyor belt is selectively advanced in and opposite to the first direction, and the rollers are selectively actuated and deactuated in coordination with the advancement of the conveyor belt. The coordination causes the box to translate through the work area without rotation along the guide surfaces and past the cutting tool along each side of the work area to form a cut around the box.

In another aspect of the invention, a method for cutting a box comprises: (a) translating a box atop obliquely rotatable rollers of a bidirectional conveyor belt without rotation on a rectangular path along the sides of a rectangular work area; and (b) forming a cut along a different side of the box along each side of the work area.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
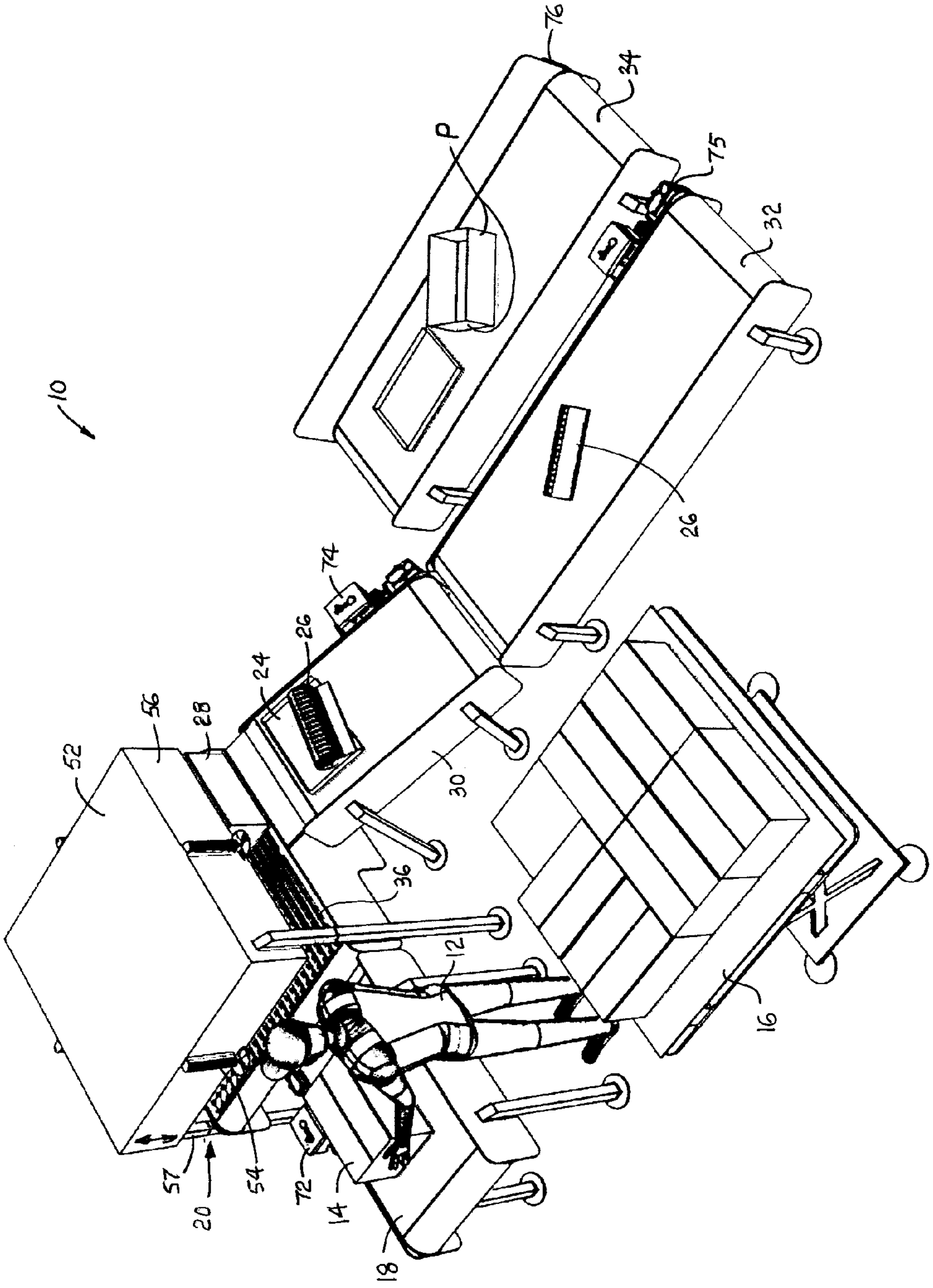
FIG. 1 is an isometric view of a box cutter embodying features of the invention.

A box cutting system 10 embodying features of the invention is shown in FIG. 1. A human operator 12 unloads the box 14 from a pallet layer on a scissor lift 16 and places it on an infeed conveyor 18. The operator presses a button (not shown) to index the box into a box cutter 20. After all four side panels P of the box are cut through, the bottom 24 of the box and the enclosed contents 26, along with the top 28 of the box, are discharged from the box cutter onto a discharge conveyor 30, such as a decline conveyor or a chute. While the box is being cut, the operator places an uncut box on the infeed conveyor. Then he manually separates the top and bottom of the cut box from the box's contents on the discharge conveyor 30 or on a takeaway conveyor 32. He deposits the box top and bottom on a trash conveyor 34 for disposal. The takeaway conveyor 32 transports the contents 26 to downstream processing stations. The close proximity of the infeed conveyor to the discharge, takeaway, and trash conveyors allows the operator to perform these steps efficiently.

Figure 2A:
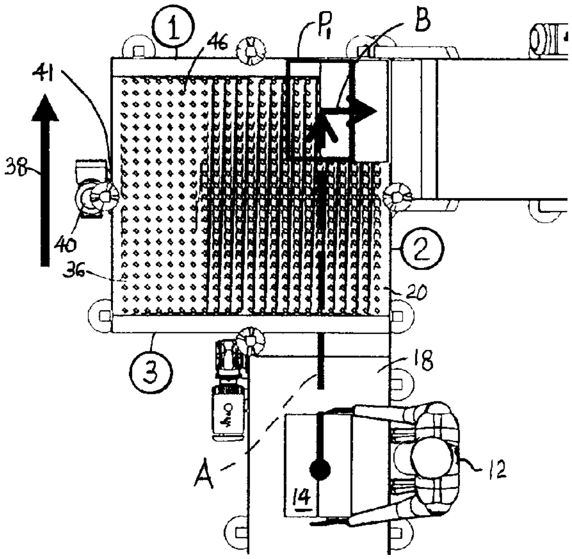
FIGS. 2A-2C are top plan views of the box cutter of FIG. 1 illustrating the path of a box through the cutter.
Figure 2B:
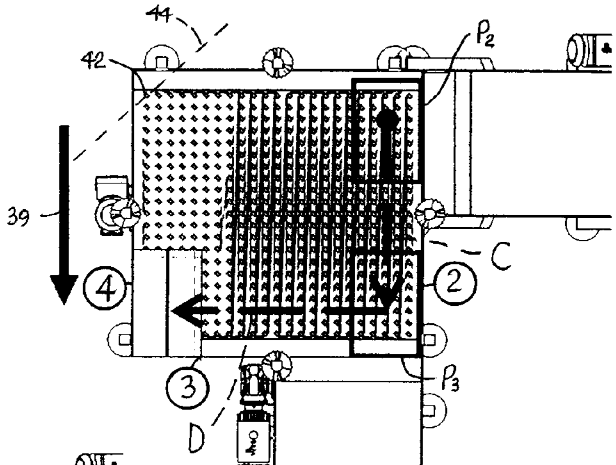
Figure 2C:
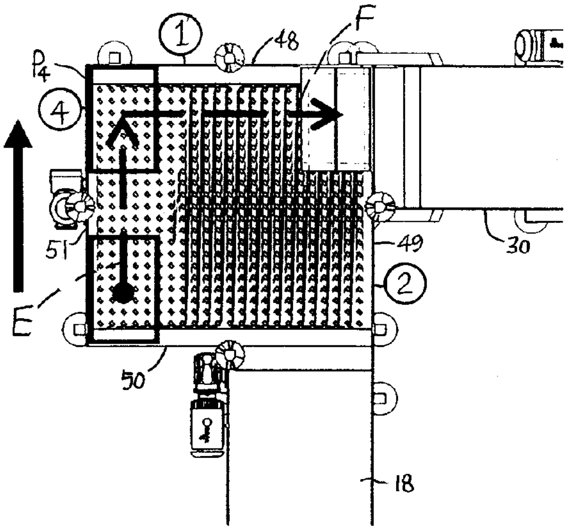

Details of the box cutter 20 are shown in FIGS. 1-3. As shown in FIGS. 2A-2C, the box cutter includes a conveyor belt 36 that can be advanced in a forward direction 38 or a reverse direction 39. The conveyor belt is conventionally trained around pulleys or sprockets (not shown) at each end of an upper run. In this example, the conveyor belt is driven bidirectionally by a motor 40 driving a shaft 41 on which drive sprockets engaging the belt in the middle of a return run are mounted. The conveyor belt has a plurality of rollers 42 that extend through the thickness of the belt, as shown in FIGS. 3A-3F, to support the bottoms of the boxes. The rollers are generally cylindrical in shape and are mounted on axles forming rotational axes 44 that are oblique to the direction of belt travel 38, 39. The INTRALOX® Series 400 Activated Roller™ belt, an oblique-roller modular plastic belt manufactured and sold by Intralox, L.L.C. of Harahan, La., U.S.A., is suitable for this application.

As shown in FIGS. 2A-2C, the upper run of the conveyor belt 36 defines a rectangular work area 46 in the box cutter 20. Because the length of the upper run equals the width of the conveyor belt, the rectangular work area is generally square with four sides 48, 49, 50, 51 of equal length. As shown in FIG. 1, the box cutter includes a cutting head 52 to which four cutting tools, such as circular saws 54, are mounted to side walls 56. The saws are mounted along each side wall of the cutting head at intermediate positions, such as midway, between opposite connecting side walls. The cutting head may be raised by lifts residing in, for example, telescoping legs 57 at the corners of the box cutter to allow boxes to enter and exit the box cutter and lowered to position the cutting tools to operate on the boxes. The interior sides of the four side walls 56 of the cutting head 52 include guide surfaces 58 that register the boxes and guide them past the cutting tools along each side of the work area. The cutting head also forms a safety cover over the work area and prevents the escape of saw dust from the cutter.

Figure 3A:
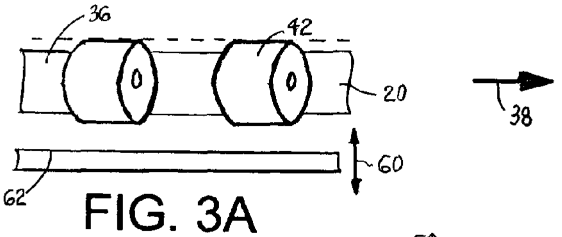
FIGS. 3A-3F are cutaway side views of a portion of the oblique-roller conveyor belt in the box cutter of FIG. 1 with the rollers actuated and deactuated in coordination with the direction of motion of the conveyor belt.
Figure 3B:
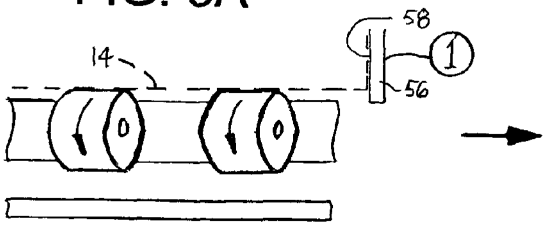
Figure 3C:
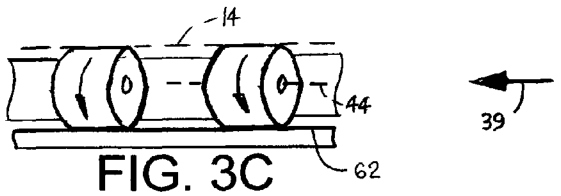
Figure 3D:
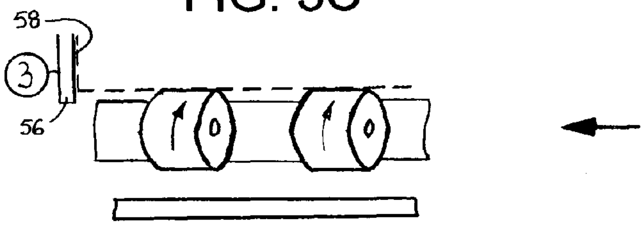
Figure 3E:
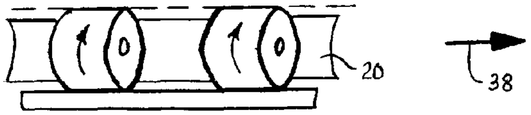
Figure 3F:
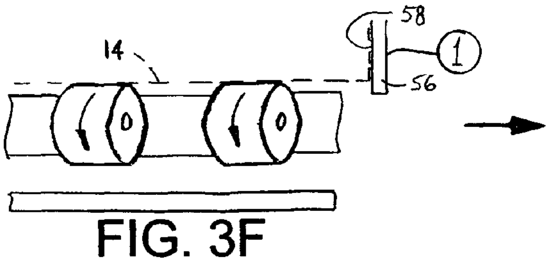

As shown in FIGS. 3A-3F, the oblique belt rollers 42 are actuated and deactuated by selectively raising and lowering, as indicated by arrow 60, a bearing surface 62 into and out of contact with the rollers protruding past the bottom of the belt as the belt advances in either direction. The bearing surface may be moved into and out of contact with the rollers in ways other than raising and lowering. For example, an array of parallel bearing surfaces extending in the direction of belt travel and spaced laterally apart the same distance as the longitudinal columns of belt rollers could be moved into and out of contact by lateral translation. Furthermore, the bearing surfaces could be formed on the peripheries of rollers rather than on flat pans or strips. When the bearing surface contacts the rollers, the motion of the belt causes the rollers to rotate on their oblique axes 44 with one component of motion under a supported box in the direction of belt travel and another component perpendicular toward a side of the belt, as shown in FIGS. 3C and 3E. So, with the bearing surface contacting the rollers, the rollers are actuated. When the bearing surface is lowered or otherwise moved out of contact with the belt rollers, the rollers are free to rotate on their axes; they are deactuated. When the rollers are deactuated, they rotate on their oblique axes only when a box supported atop the rollers encounters an obstruction, such as a guide surface blocking its advance in the direction of belt travel, as shown in FIGS. 3B, 3D, and 3F. In those circumstances, the oblique rollers rotate with a component of motion opposite to the direction of belt travel and an orthogonal component parallel to the blocking guide surface, which slides the box along, while pushing it against, the guide surface. In general, a belt roller is considered to be "actuated" when it is actively rotated by something, e.g., rolling on a bearing surface, other than interaction with a box whose progress in the direction of belt travel is blocked.

Figure 4:
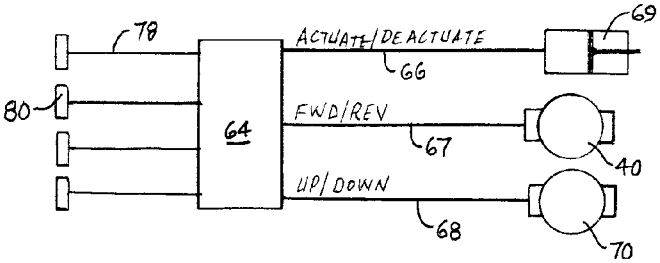
FIG. 4 is a block diagram of a control system usable in a box cutter as in FIG. 1.

The box cutter is controlled by a controller 64, as shown in FIG. 4. The controller may be realized as a programmable logic controller, a desktop computer, a workstation, an embedded microcontroller, or any suitable programmable device. The controller coordinates the direction of belt travel with the actuation of the belt rollers to move the box around the work area past each of the cutting tools. The controller has three main output signals: an actuate/deactuate signal 66 that raises and lowers the bearing surface by a linear actuator 69, for instance; a forward/reverse signal 67 that controls the direction of the conveyor belt motor 40, and an up/down signal to a lift motor 70 that raises and lowers the cutting head. Other output signals (not shown) include signals to drive the infeed conveyor drive and, perhaps, the discharge, takeaway, and trash conveyor drives 74, 75, 76 (as in FIG. 1) and to turn the cutting tools on and off. The controller also receives input signals 78 from sensors 80, such as pressure switches or optical devices, that sense when a box is in contact with one of the guide surfaces along the side of the work area.

The operational sequence of cutting a box with the box cutter is described with reference to FIGS. 2, 3, and 5. The operator 12 places the box 14 on the infeed conveyor 18 square with the rectangular work area 46 of the box cutter 20, as shown in FIG. 2A. In the meantime, as indicated by the timing diagram of FIG. 5, the cutting tool is in a raised position (UP) to permit the box to enter the work area. The conveyor belt is advancing in the forward direction (FWD) 38, and the belt rollers 42 are deactuated. For illustrative purposes, the four sides of the work area are indicated by the numerals 1-4 in circles in the figures. Each of the vertical dashed lines in FIG. 5 extending down from the circled numerals indicate the time of initial contact or crossing of a box with that side indicated by the numeral in the associated circle. The box follows a generally rectangular path through the work area. The path segments are identified as A-F in FIG. 2 and correspond roughly to FIGS. 3A-3F and to the time intervals A-F in FIG. 5.

The box is indexed by the infeed conveyor over side 3 of the cutter's work area. Once the box clears side 3, the controller lowers the cutting head by changing the state of the UP/DOWN signal to DOWN (82 in FIG. 5). Because the conveyor belt is moving forward and the rollers are deactuated, the box follows linear path segment A to side 1 of the work area. As shown in FIG. 3A, the bearing surface 62 is lowered and the rollers do not rotate. As soon as the forward side panel $P_1$ of the box hits the guide surface 48 at side 1 of the work area, the box's forward progress is blocked, which causes the deactuated rollers to rotate as shown in FIG. 3B and push the box to the right, guided by the guide surface on side 1 along path segment B in FIG. 2A.

Figure 5:
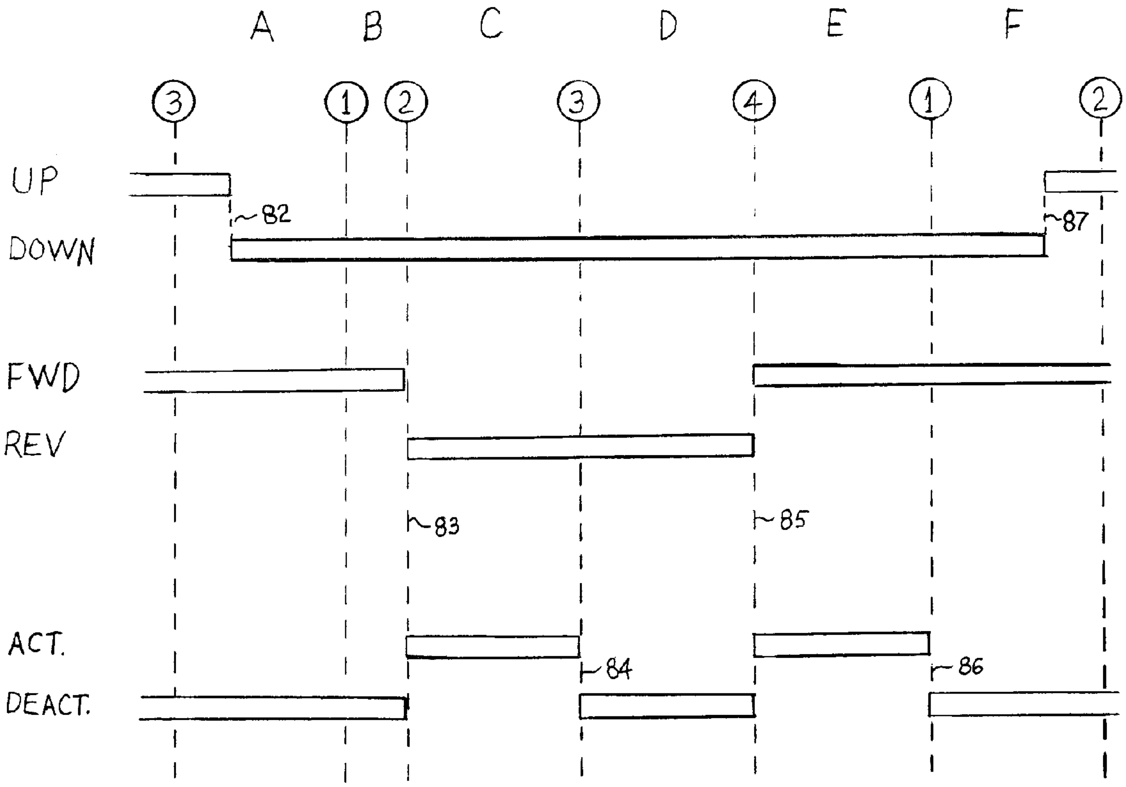
FIG. 5 is a timing diagram illustrating the sequence of control signals used to move a box through the work area along the path shown in FIGS. 2A-2C.

Once the right side panel $P_2$ hits the guide surface at side 2 of the work area, the signal from the sensor for side 2 notifies the controller to reverse the conveyor belt and actuate the belt rollers (83 in FIG. 5). The bearing surface 62 underlying the conveyor belt in the work area is raised into contact with the bottoms of the rollers, which keeps them rolling in the same direction as for path segment B, but also to push the box along the guide surface on side 2 past the rotating circular saw blade and towards side 3. The saw blade cuts a horizontal slit along side panel $P_2$.

When the rearward side panel $P_3$ of the box, now leading, hits the guide surface at side 3 of the work area, a signal from the sensor for side 3 notifies the controller of the contact. The controller deactuates the rollers (84 in FIG. 5), which causes the box on the reverse-traveling conveyor belt to slide laterally to the left in FIG. 2 against the guide surface at side 3 along linear path segment D. The cutting tool on side 3 cuts a horizontal slit in side panel $P_3$ of the box as it slides past.

When the left side panel $P_4$ of the box hits the guide rail at side 4 of the work area, the sensor for side 4 signals the controller to reverse the conveyor belt back to the forward direction and to actuate the belt rollers (85 in FIG. 5). This causes the actuated rollers to rotate as in FIG. 3E and push the box against the guide surface at side 4 of the work area as the box is conveyed along path segment E. The saw along side 4 cuts a horizontal slit in side panel $P_4$ of the box as it passes.

When the forward side panel $P_1$ of the box has reached side 1 of the work area, the signal from the sensor for side 1 of the work area notifies the controller, which then deactuates the rollers (86 in FIG. 5). Because the box is blocked by the guide surface at side 1, the deactuated rollers reverse their rotation and slide the box along the side 1 guide rail on a path segment F. Just after the cutting tool on side 1 cuts a horizontal slit in forward panel $P_1$ of the box, the controller signals the lift to raise (UP, 87 in FIG. 5) so that the box can be discharged over side 2 of the work area onto the discharge conveyor 30. This cycle repeats for the next incoming box.

Thus, the box cutter's conveyor belt translates a box without rotation in a generally rectangular path pushed in registration against guide surfaces bounding the work area on four sides past a cutting tool on each side. Each cutting tool cuts a horizontal slit in one side panel of the box. The slits are aligned so that a continuous cut is made around the periphery of the box to allow for easy removal of its contents and disposal of the box sections.

Although the invention has been described in detail with reference to a preferred version, other versions are possible. For example, the conveyor belt shown has rollers that extend past the bottom of the belt to engage bearing surfaces. But rollers that do not necessarily extend below the bottom of the belt and that can be actuated in other ways, such as motorized rollers or magnetically actuated rollers, could be used as well in the box cutter. As another example, the controller could be programmed to convey the box on a different path through the work area. Different kinds of cutting tools or cutting tools arranged to cut differently shaped cuts into the sides of the boxes could be used. So, as these few examples suggest, the claims are not meant to be limited by the details of the disclosure.

What is claimed is:

1. A box cutter comprising:

a conveyor belt advanceable in and opposite to a first direction and having a plurality of rollers rotatable on axes oblique to the first direction and supporting a box within a work area having four sides;

a guide surface disposed along each of the sides of the work area to register and guide the box;

a cutting tool disposed at an intermediate position along each of the sides to cut into a side panel of the box registered against the guide surface;

wherein the conveyor belt is selectively advanced in and opposite to the first direction and the rollers are selectively actuated and deactuated in coordination with the advancement of the conveyor belt to translate the box through the work area along the guide surfaces without rotation against the guide surfaces and past the cutting tool along each side of the work area to form a cut around the box; and a controller selectively advancing the conveyor belt in coordination with actuating and deactuating the rollers to cause the box to follow a path through the work area against the guide surfaces at the sides of the work area to engage each cutting tool with a different side panel of the box.

2. A box cutter as in claim 1 comprising a bearing surface underlying the conveyor belt in the work area, wherein the bearing surface is selectively movable into and out of contact with the rollers to actuate and deactuate the rollers as the conveyor belt advances.

3. A box cutter as in claim 1 comprising a cutting head having four side walls, each side wall forming one of the guide surfaces and a mounting support for one of the cutting tools and wherein the cutting head is raised to allow the box to enter and exit the work area and lowered to guide the box through the work area and past the cutting tools.

4. A box cutter as in claim 1 further comprising an infeed conveyor delivering the box to the conveyor belt over a first side of the work area and a discharge conveyor receiving the box from the conveyor belt over a different second side of the work area.

5. A box cutter as in claim 4 wherein the first side and the second side are perpendicular to each other.

6. A box cutter as in claim 1 wherein each cutting tool comprises a circular saw blade cutting in a horizontal plane.

7. A box cutter as in claim 1 further comprising a sensor associated with at least one of the sides to detect a box contacting the guide surface on the at least one side.

* * * * *